United States Patent
Duprat

(10) Patent No.: US 10,647,220 B2
(45) Date of Patent: May 12, 2020

(54) CONDUCTIVE TRACKS ELASTOMERIC CARRIER WITH RECTANGULAR SECTION FOR GROUND ELECTRIC FEEDING SYSTEM

(71) Applicant: ALSTOM TRANSPORT TECHNOLOGIES, Saint-Ouen (FR)

(72) Inventor: Patrick Duprat, Le Raincy (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 78 days.

(21) Appl. No.: 15/962,273

(22) Filed: Apr. 25, 2018

(65) Prior Publication Data

US 2018/0304769 A1 Oct. 25, 2018

(30) Foreign Application Priority Data

Apr. 25, 2017 (FR) ...................... 17 53583

(51) Int. Cl.
| | |
|---|---|
| B60M 7/00 | (2006.01) |
| B60M 1/30 | (2006.01) |
| B60L 53/14 | (2019.01) |
| B60L 53/36 | (2019.01) |

(52) U.S. Cl.
CPC ............. *B60M 7/003* (2013.01); *B60L 53/14* (2019.02); *B60L 53/36* (2019.02); *B60M 1/30* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
CPC . B60M 1/08; B60M 1/30; B60M 1/36; B60M 3/04; B60M 7/00; B60L 5/39
See application file for complete search history.

(56) References Cited

U.S. PATENT DOCUMENTS

| | | | | |
|---|---|---|---|---|
| 383,274 A | * | 5/1888 | Name Not Available | ...................  B60M 1/30 191/21 |
| 4,139,071 A | * | 2/1979 | Tackett | ..................... B60K 1/00 180/165 |
| 4,476,947 A | * | 10/1984 | Rynbrandt | ................ B60L 9/00 180/2.1 |

(Continued)

FOREIGN PATENT DOCUMENTS

| | | |
|---|---|---|
| EP | 1043186 A1 | 10/2000 |
| FR | 3017342 A1 | 8/2015 |

(Continued)

OTHER PUBLICATIONS

Preliminary Search Report dated Jan. 9, 2018 during the prosecution of French Patent Application No. 1753583.

*Primary Examiner* — Jason C Smith

(74) *Attorney, Agent, or Firm* — Troutman Sanders LLP

(57) ABSTRACT

A carrier for one or several electrically conductive tracks of a ground electric feeding system for a motor vehicle in the form of a strip of electrically insulating elastomeric material, comprising a substantially planar electric feeding surface of the land vehicle, provided with one or several longitudinal grooves, each groove being intended to receive a conductive track, and a surface for securing to a roadway, opposite the electric feeding surface. The carrier has a rectangular cross-section and the electric feeding surface and the securing surface form the long sides of said rectangle.

11 Claims, 1 Drawing Sheet

(56) References Cited

U.S. PATENT DOCUMENTS

| | | | | |
|---|---|---|---|---|
| 5,464,082 A * | 11/1995 | Young | B60L 5/18 | 191/2 |
| 6,189,664 B1 * | 2/2001 | Siciliano | B60M 1/103 | 191/14 |
| 6,209,693 B1 * | 4/2001 | Siciliano | B60M 1/103 | 191/18 |
| 6,250,442 B1 * | 6/2001 | Perraud | B60M 1/08 | 191/1 R |
| 6,471,020 B1 * | 10/2002 | Hernandez | B60L 53/14 | 191/2 |
| 8,220,568 B2 * | 7/2012 | Stoicoviciu | B60K 25/08 | 180/2.1 |
| 8,365,888 B2 * | 2/2013 | Re Fiorentin | B60L 5/42 | 191/13 |
| 8,493,024 B2 * | 7/2013 | Kissel, Jr. | B60L 5/40 | 320/109 |
| 8,833,533 B2 * | 9/2014 | Suh | B60L 11/1816 | 191/10 |
| 10,189,363 B2 * | 1/2019 | Ricci | B60L 11/1829 | |
| 10,336,194 B2 * | 7/2019 | Ricci | | |
| 2011/0094840 A1 * | 4/2011 | Sakita | B60L 5/005 | 191/2 |
| 2011/0106349 A1 * | 5/2011 | Sakita | B60L 53/32 | 701/22 |
| 2013/0037367 A1 * | 2/2013 | Aguilar | B60L 5/36 | 191/22 C |
| 2014/0319927 A1 * | 10/2014 | Cho | H02J 50/40 | 307/104 |
| 2015/0274034 A1 * | 10/2015 | Hourtane | B60L 5/39 | 191/6 |
| 2018/0304752 A1 * | 10/2018 | Duprat | B60L 5/04 | |
| 2018/0304769 A1 * | 10/2018 | Duprat | B60M 7/003 | |
| 2019/0001823 A1 * | 1/2019 | Duprat | B60L 5/08 | |

FOREIGN PATENT DOCUMENTS

| | | |
|---|---|---|
| FR | 3019113 A1 | 10/2015 |
| WO | 2010098547 A2 | 9/2010 |
| WO | 2010117139 A2 | 10/2010 |

* cited by examiner

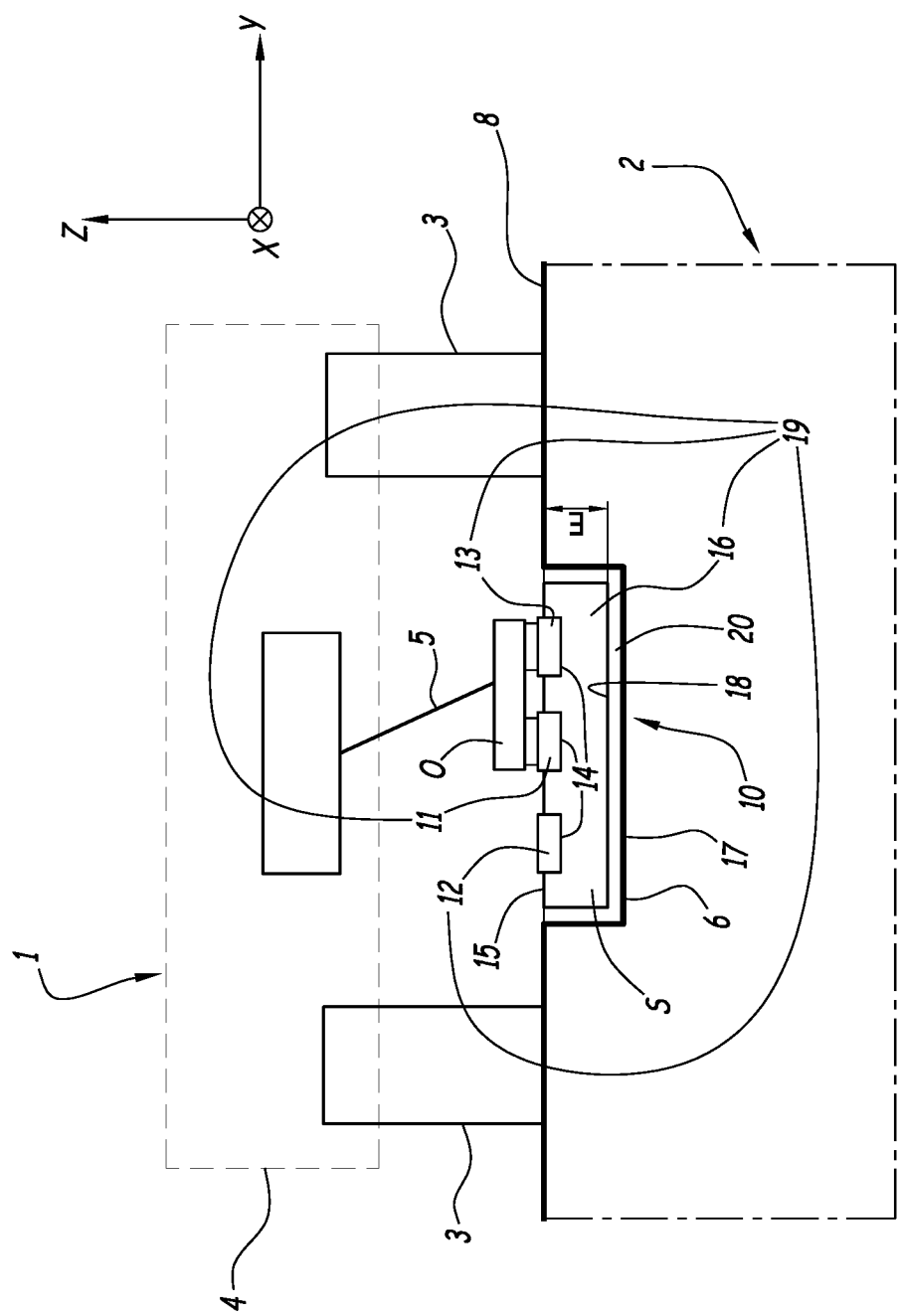

CONDUCTIVE TRACKS ELASTOMERIC CARRIER WITH RECTANGULAR SECTION FOR GROUND ELECTRIC FEEDING SYSTEM

CROSS-REFERENCE TO RELATED APPLICATIONS

The present application claims priority from French Patent Application No. 17 53583 filed Apr. 25, 2017. The entire contents of which are incorporated herein by reference.

FIELD OF THE INVENTION

The present invention relates to a carrier for one or several electrically conductive tracks of a ground electric feeding system for a land vehicle, in particular a motor vehicle, in the form of a strip of electrically insulating elastomeric material, comprising a substantially planar electric feeding surface of the land vehicle, provided with one or several longitudinal grooves, each groove being intended to receive a conductive track, and a surface for securing to a roadway, opposite the electric feeding surface.

BACKGROUND

Such a carrier is known from document FR 3,017,342 A1. This carrier 36 has the drawback of being complicated to incorporate into the pavement 12 of a road. Indeed, due to the "V" shape of its lower surface 52, this carrier requires a concrete base 22 with a complementary V-shaped upper surface as interface for securing to the pavement.

Document FR 3,019,113 A1 describes another ground feeding system with carriers 25, 26 for conductive tracks 11, 12 in the form of profiles. This document also provides for sealing with concrete 7.

U.S. Pat. No. 383,274 describes rubber resilient strips u, u' bearing conductive segments t. However, this known solution is provided for integration into railway ties A and is not suitable for being integrated into pavement.

SUMMARY

One aim of the invention is therefore to produce an improved conductive track carrier that can be integrated simply and quickly into a roadway.

According to the invention, this aim is achieved with the carrier as defined above, characterized in that said carrier has a rectangular cross-section and in that the electric feeding surface and the securing surface form the long sides of said rectangle.

By providing a rectangular cross-section of the carrier, the latter can be placed and frozen directly in a trench with a complementary rectangular section of the pavement. Such a trench is produced easily by milling the pavement with a profiler. Since the electric feeding surface and the securing surface form the long sides of said rectangle, the carrier is thin. Thus, the milling of the pavement can be limited to a shallow depth, which makes the milling easier.

In preferred embodiments, the carrier according to the invention comprises one, several or all of the following, according to all technically possible combinations:
  the electric feeding surface is provided with exactly three longitudinal grooves for receiving the conductive track;
  the electric feeding surface is provided with at least two longitudinal grooves, said grooves being situated next to one another and extending parallel to one another;
  the carrier is in a single molded piece;
  the carrier is made from rubber, such as the ethylene-propylene-diene monomer known under the acronym EPDM;
  a water draining device.

The invention also relates to a rail segment of a ground electric feeding system for a land vehicle, in particular a motor vehicle, the rail segment including a carrier as defined above, and a conductive track in each groove of the electric feeding surface, each conductive track being mechanically fixed in its groove, in particular by screwing.

Preferably, the rail segment according to the invention comprises one, several or all of the following, according to all technically possible combinations:
  a radio antenna and/or a heating system;
  exactly three grooves in the electric feeding surface, with a phase conductive track in the first groove, a reverse current conductive track in the second groove and a neutral conductive track in the third groove, the phase conductive track preferably being arranged between the other two tracks.

The invention also relates to a roadway with a ground electric feeding system for a land vehicle, in particular a motor vehicle, the rail being made up of a series of rail segments as defined above juxtaposed behind one another in a longitudinal direction, the rail being inserted in a trench arranged in the pavement and being fixed in the trench preferably by a bituminous joint.

BRIEF DESCRIPTION OF THE DRAWINGS

The invention will be better understood upon reading the following description, provided solely as an example, in reference to the sole FIGURE, which shows a cross-section of a roadway according to the invention.

Backed by its experience in the field of ground electric feeding systems, known under the acronym of APS systems, of the type using conduction, for guided electric vehicles, i.e., vehicles forced to move along tracks (in particular tramways moving along railroad tracks), the applicant has developed this ground level power supply system for non-guided electric vehicles.

FIG. 1 shows a car 1, as a non-guided electric vehicle, traveling on pavement 2.

A trihedron XYZ is traditionally associated with the car 1: the axis X in the longitudinal direction, oriented toward the front; the axis Y in the transverse direction, oriented from left to right; and the axis Z in the vertical direction, oriented from bottom to top.

DETAILED DESCRIPTION

The car 1 comprises a body 4 and wheels 3, some of which are drive wheels. The car 1 comprises steering means (not shown) allowing the driver to change the angle of the drive wheels in the plane XY in order to steer the vehicle 1.

The car 1 comprises a rechargeable battery and an electric motor (not shown).

The car 1 is equipped with capture means making it possible to collect electric power during the movement of the car 1. The capture means are generally referenced by number 5.

The capture means 5 comprise a shoe 0 able to be placed in sliding contact on a pair of power supply tracks of the ground level power supply system, which will now be described.

The pavement 2 comprises a trench 6 inside which the ground electric feeding system is positioned, generally referenced by number 10.

Once the system 10 is positioned in the trench 6, the upper surface 8 of the pavement 2 is continuous over the entire width thereof. The upper surface 8 is substantially planar.

In position, the system 10 has, flush with the surface 8 of the pavement 2:
- a phase conductive track 11, designed to be electrically connected to a power source, for example delivering a potential Vs of +750 V DC;
- a neutral conductive track 12, designed to be electrically connected to a reference potential $V_{ref}$, for example 0 V;
- a reverse current conductive track 13.

The phase track 11 has a width of about 5 cm and a length of several meters. The exact length depends on the type of application.

Advantageously, the neutral 12 and reverse current 13 tracks are made identically to the phase track 11.

The neutral 12 and reverse current 13 tracks run parallel to the phase track 11, on either side of the latter. The lateral edges of the phase track 11 and the lateral edges of the neutral track 12 and the reverse current track 13, which are across from one another, are separated by a distance of 12 to 15 cm.

According to the invention, said tracks 11, 12 and 13 are inserted into longitudinal grooves 14 made in an electric feeding surface 15 of a conductive track carrier 16. The grooves 14 are situated next to one another and extend parallel to one another.

The carrier 16 has a rectangular cross-section S. It is molded in one piece and made from an electrically insulating elastomeric material. Preferably, the material is a rubber, such as ethylene-propylene-diene monomer, known under the acronym EPDM.

The carrier 16 assumes the form of a parallelepiped strip. Advantageously, this strip is about 3 m long and between 40 and 50 cm wide.

The carrier 16 is secured to the bottom 17 of the trench 6 by its lower securing surface 18. The securing surface 18 is opposite the feeding surface 15.

It will be noted that the feed 15 and securing 18 surfaces form the long sides of the rectangle making up the cross-section S. Thus, the carrier 16 has a small thickness E, preferably of about 8 cm.

Preferably, the carrier 16 comprises a water draining device. This device in particular makes it possible to discharge rainwater to avoid current leaks from the conductive track 11 toward the tracks 12 or 13.

The carrier 16 and the conductive tracks 11, 12 and 13 together form a rail segment 19. The rail segment 19 may comprise a radio reception and/or transmission antenna allowing radiocommunication with the car 1. A heating system, for example electric, may also be integrated into the rail segment 19. Such heating prevents ice from forming in the winter.

A series of rail segments 19 can be juxtaposed behind one another in the longitudinal direction X in the trench 6 in order to form a feed rail.

The rail segments 19, and therefore the complete rail, are frozen in the trench 6 using a glue, for example a bituminous joint 20. The glue 20 is arranged on the walls of the trench 6.

A rail according to the invention is very easy to install in pavement 2. It suffices to machine the asphalt for the pavement, for example by milling, to create the trench 6.

Once the trench has been made, the bituminous joint is placed on the walls of the trench 6. Then, the carriers 16 are inserted behind one another in the trench 2. The carriers 16 are fixed in position by the bituminous glue. Lastly, the conductive tracks 11, 12 and 13 are inserted into the grooves 14 and fixed therein, for example using screws.

The present invention in particular has the following advantages:
- A single continuous carrier 16 incorporating all three of the phase, reverse current and neutral tracks;
- The parallelepiped shape of the carrier 16 is particularly suitable for being incorporated into an asphalt road;
- Cracks are prevented from forming in the road, in particular owing to the materials used.

The invention claimed is:

1. A carrier for one or several electrically conductive tracks of a ground electric feeding system for a land vehicle in the form of a strip of electrically insulating elastomeric material, comprising:
   a substantially planar electric feeding surface of the land vehicle, provided with one or several longitudinal grooves, each groove being intended to receive a conductive track; and
   a surface securing to a roadway, opposite the electric feeding surface,
   wherein said carrier has a rectangular cross-section and wherein the electric feeding surface and the securing surface form the long sides of said rectangle.

2. The carrier according to claim 1, wherein the electric feeding surface is provided with exactly three longitudinal grooves for receiving the conductive track.

3. The carrier according to claim 1, wherein the electric feeding surface is provided with at least two longitudinal grooves, said grooves being situated next to one another and extending parallel to one another.

4. The carrier according to claim 1, the carrier being a single molded piece.

5. The carrier according to claim 1, the carrier being made from rubber, such as the ethylene-propylene-diene monomer known under the acronym EPDM.

6. The carrier according to claim 1, further comprising a water draining device.

7. A rail segment of a ground electric feeding system for a land vehicle, the rail segment including:
   a carrier according to claim 1; and
   a conductive track in each groove of the electric feeding surface, each conductive track being mechanically fixed in its groove.

8. The rail segment according to claim 7, further comprising a radio antenna or a heating system.

9. The rail segment according to claim 7 comprising exactly three grooves in the electric feeding surface, with a phase conductive track in the first groove, a reverse current conductive track in the second groove and a neutral conductive track in the third groove, the phase conductive track preferably being arranged between the other two tracks.

10. A roadway with a ground electric feeding system for a land vehicle, the ground electric feeding system comprising a rail made up of a series of rail segments according to claim 7, juxtaposed behind one another in a longitudinal direction, the rail being inserted in a trench arranged in the roadway and being fixed in the trench preferably by a bituminous joint.

11. The rail segment according to claim 7, comprising screws for mechanically fixing each conducting track to its associated groove.

\* \* \* \* \*